US006246720B1

(12) United States Patent
Kutner et al.

(10) Patent No.: US 6,246,720 B1
(45) Date of Patent: Jun. 12, 2001

(54) FLEXIBLE SOFTWARE-BASED DECODING SYSTEM WITH DECOUPLED DECODING TIMING AND OUTPUT TIMING

(75) Inventors: Michael Alan Kutner, Mountain View, CA (US); Markus Hendrikus Veltman, Tokyo (JP); Masahito Yamane, San Jose; Ikuo Tsukagoshi, Sunnyvale, both of CA (US); Klaus Zimmermann, Stuttgart (DE)

(73) Assignees: Sony Corporation of Japan, Tokyo (JP); Sony Electronics, Inc., Park Ridge, NJ (US)

( * ) Notice: Subject to any disclaimer, the term of this patent is extended or adjusted under 35 U.S.C. 154(b) by 0 days.

(21) Appl. No.: 09/422,910

(22) Filed: Oct. 21, 1999

(51) Int. Cl.[7] .............................. H04N 7/12; H04N 7/133
(52) U.S. Cl. .................................... 375/240.25; 348/243.1
(58) Field of Search ............................. 375/240.25, 240; 348/384.1, 390.1, 423.1; 358/426; H04N 7/12, 7/133

(56) References Cited

U.S. PATENT DOCUMENTS

| | | | | |
|---|---|---|---|---|
| 5,293,229 | * | 3/1994 | Iu ........................................ | 375/240 |
| 5,561,465 | * | 10/1996 | Fautier et al. ................... | 375/240.12 |
| 5,903,311 | * | 5/1999 | Ozcelik et al. ................... | 348/403.1 |
| 5,913,031 | * | 6/1999 | Blanchard ........................ | 348/423.1 |

* cited by examiner

Primary Examiner—Howard Britton
Assistant Examiner—Nhon T Diep
(74) Attorney, Agent, or Firm—Wagner, Murabito & Hao LLP (57) ABSTRACT

A flexible software-based decoding system with decoupled decoding timing and output timing. In one embodiment, a computer software implemented method of decoding a data stream comprising encoded video data is provided. In this embodiment, the software method comprises the step of maintaining a number of already decoded and ready-for-output frames in a frame buffer. The method also comprises the step of decoding a first encoded frame of the data stream to generate an additional decoded frame. The method further comprises the step of outputting a first of the decoded frames before decoding of the first encoded frame is completed if the decoding step requires more time than a predefined frame output time to complete. Moreover, in this embodiment, the method comprises the step of adding the first additional decoded frame to the frame buffer. In this embodiment, real-time output is maintained irrespective of whether completion of the decoding step requires more time than the predefined frame output time for particular frames. In one embodiment, the method further comprises the step of decoding a second encoded frame of the data stream substantially immediately upon completion of the decoding step to generate a second additional decoded frame, provided that the completion of the decoding step requires more time than the predefined frame output time, and also the step of adding the second additional decoded frame to the frame buffer.

24 Claims, 10 Drawing Sheets

Task Execution and Message Passing - Overrun Case

FIGURE 4
Task Execution and Message Passing Non-Overrun Case

FIGURE 5
Task Execution and Message Passing - Overrun Case

FLEXIBLE SOFTWARE-BASED DECODING SYSTEM WITH DECOUPLED DECODING TIMING AND OUTPUT TIMING

BACKGROUND OF THE INVENTION

1. Field of the Invention

The present invention relates to the design of decoding systems. More specifically, the present invention pertains to a software decoding system with a mechanism for handling decoding time overruns while sustaining real time output.

2. Related Art

The ever-increasing demand for high quality audio and video media has fueled the advent of audio and video storage and retrieval technology. In particular, one popular set of standards for audio and video compression is the MPEG (Moving Pictures Experts Group) standard. Today, there are several versions of the MPEG standard, each designed for different applications. Specifically, MPEG-2 is designed for high bandwidth applications such as broadcast television, including high definition television (HDTV). In order to listen to and view the content in an MPEG-2 transport stream, a decoding system capable of decoding the compressed audio and video data is essential.

Hardware decoders have been used in most real time MPEG-2 decoding applications due to their speed and because the performance of programmable signal processors has only recently been able to fully support MPEG-2 demultiplexing and decoding. Therefore, a complete software-based decoding system for MPEG-2 was not previously feasible. Now that programmable signal processors can deliver the requisite performance for software-based processing of an MPEG-2 data stream, software-based MPEG-2 decoding systems have been proposed and realized.

A software-based decoding system offers many advantages over hardware decoders. One major advantage is the flexibility that is afforded by a software-based system over a pure hardware-based system. In a hardware decoder, the implementing logic is hard-wired in various hardware components of the decoder. Once fabrication of the hardware components has begun, the hardware layout generally cannot be altered to accommodate any design changes. In contrast, in a software-based system, the software code implementing the functionalities is developed and then loaded into a programmable signal processor. Thus, any last minute changes can be incorporated into the software and loaded into the signal processor without being limited by the manufacturing schedule of the signal processor. With reprogrammable signal processors, it is even possible to reload updated software code into the processor subsequently if that becomes necessary. Such ability to accommodate design changes is highly desirable. Moreover, a software-based decoding system can also be programmed to process various MPEG versions without hardware modifications. As such, there exists a need for a software-based decoding system and method which provides greater flexibility over existing hardware-based MPEG-2 decoders.

An MPEG-2 decoding system generally comprises multiple functional blocks which process a stream of compressed data and system information to generate uncompressed audio and video outputs. More specifically, the functional blocks, such as a demultiplexing block and a decoding block, form a pipeline to process the stream of incoming data. In hardware decoders, each functional block is typically implemented as an independent hardware block. These hardware blocks operate in parallel, with the data being processed moving from one block to the next.

Importantly, in such hardware designs with the parallel pipelining as described above, processing time in each block is constant irrespective of the complexity of the incoming data stream. In particular, the processing time in the decoding block is fixed for each and every frame in the incoming data stream regardless of the complexity of the compressed data and system information contained therein.

Like a hardware decoder, a software-based decoding system also comprises multiple functional blocks, or modules, for processing an MPEG-2 data stream, but the modules are implemented with software running on a signal processor. However, unlike the case in a hardware decoder, processing time in each of the software modules of a software-based decoding system is highly dependent upon the complexity of the compressed data and system information in the MPEG-2 data stream. The processing time varies from frame to frame in a software-based decoding system. On the other hand, the display time for each frame remains the same irrespective of the complexity of the frame. This timing discrepancy between processing and display poses a challenge in the implementation of a software-based decoding system due to the potential occurrence of overrun cases.

It is appreciated that there are signal processors that can provide the level of performance necessary to ensure that the processing time of a frame processed by a software decoder never exceeds the display time of that frame. In other words, a high performance processor capable of handling the worst case scenario (e.g., the most complex frame possible in the data stream in question) can be used for implementing a software-based decoding system so that overrun cases are precluded and real time display is guaranteed. However, these high performance processors are typically expensive. Since these decoders will be widely deployed in various end-user appliances, it is highly advantageous to minimize the cost of these decoders and their components. Therefore, it would be advantageous to provide a software-based decoding system which uses an inexpensive processor and yet which can sustain real time display in all circumstances.

A further challenge exists in the implementation of a software-based decoding system. Typical signal processors available on the market today support a single instruction pointer (program counter). A processor of this type performs a single thread of execution at any given time. Consequently, in a software-based decoding system implemented on such a signal processor, the total processing time for a given frame through the various functional modules is cumulative. In other words, the total processing time for a frame is the sum of the processing time in each of the functional software modules for that frame. Thus, for a frame of high complexity, the extra processing time required in each functional modules adds up, thereby presenting a greater timing discrepancy to be overcome in implementing a software-based decoding system. Thus, it would be advantageous to provide a software-based decoding system which uses a processor having a single instruction pointer.

SUMMARY OF THE INVENTION

Thus, a need exists for a software-based decoding system and method which provides greater flexibility over existing hardware-based MPEG-2 decoders. A further need exists for a software-based decoding system and method which meets the above need and which uses an inexpensive processor and can sustain real time display in all circumstances. Yet another need exists for a software-based decoding system and method which meets all of the above needs and which can be implemented on a signal processor that supports a single instruction pointer.

Accordingly, the present invention provides a software-based decoding system and method using a programmable signal processor rather than hardwired components and thus provides greater flexibility over existing hardware-based MPEG-2 decoders. Moreover, embodiments of the present invention use an inexpensive processor and can sustain real time display in all circumstances including overrun cases. Furthermore, embodiments of the present invention can be efficiently implemented on a signal processor that supports a single instruction pointer. These and other advantages of the present invention not specifically mentioned above will become clear within discussions of the present invention presented herein.

More specifically, embodiments of the present invention include a flexible software-based decoding system with decoupled decoding timing and output timing. In one embodiment, a computer software implemented method of decoding a data stream comprising encoded video data is provided. In this embodiment, the method comprises the step of maintaining a number of already decoded and ready-for-output frames in a frame buffer. The method also comprises the step of decoding a first encoded frame of the data stream to generate an additional decoded frame. The method further comprises the step of outputting a first of the decoded frames before decoding of the first encoded frame is completed if the decoding step requires more time than a predefined frame output time to complete. Moreover, in this embodiment, the method comprises the step of adding the first additional decoded frame to the frame buffer. Importantly, in this embodiment, real-time output is maintained irrespective of whether completion of the decoding step requires more time than the predefined frame output time for particular frames. In a specific embodiment, the present invention includes the above steps and further comprises the step of decoding a second encoded frame of the data stream substantially immediately upon completion of the decoding step to generate a second additional decoded frame, provided that the completion of the decoding step requires more time than the predefined frame output time, and also the step of adding the second additional decoded frame to the frame buffer.

Embodiments of the present invention include the above steps and further comprise the step of outputting the first of the decoded frames repeatedly until a new frame is available in the frame buffer. Additionally, embodiments of the present invention include the above and wherein the decoding step comprises the step of identifying header information of the first encoded frame of the data stream, and wherein the demultiplexing step further comprises the step of determining a correct time to begin decoding a second encoded frame of the data stream using the header information as soon as it is identified, thus facilitating the timing calculation to be performed promptly and thereby enabling overrun cases to be handled efficiently.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION OF THE INVENTION

In the following detailed description of the present invention, a flexible software-based decoding system with decoupled decoding timing and output timing, numerous specific details are set forth in order to provide a thorough understanding of the present invention. However, it will be recognized by one skilled in the art that the present invention may be practiced without these specific details or with equivalents thereof. In other instances, well known methods, procedures, components, and circuits have not been described in detail as not to unnecessarily obscure aspects of the present invention.

NOTATION AND NOMENCLATURE

Some portions of the detailed descriptions which follow are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "maintaining", "decoding", "outputting", "removing", "adding" or the like, refer to the action and processes of a computer system (e.g., FIG. 1A), or similar electronic computing device, that manipulates and transforms data represented as physical (electronic) quantities within the computer system's registers and memories into other data similarly represented as physical quantities within the computer system memories or registers or other such information storage, transmission or display devices.

Aspects of the present invention, described below, are discussed in terms of steps executed on a computer system. These steps (e.g., processes 600, 700 and 800) are implemented as program code stored in computer readable memory units of a computer system and are executed by the processor of the computer system. Although a variety of different computer systems can be used with the present invention, an exemplary general purpose computer system 100 is shown in FIG. 1A.

COMPUTER SYSTEM ENVIRONMENT

Figure 1A:
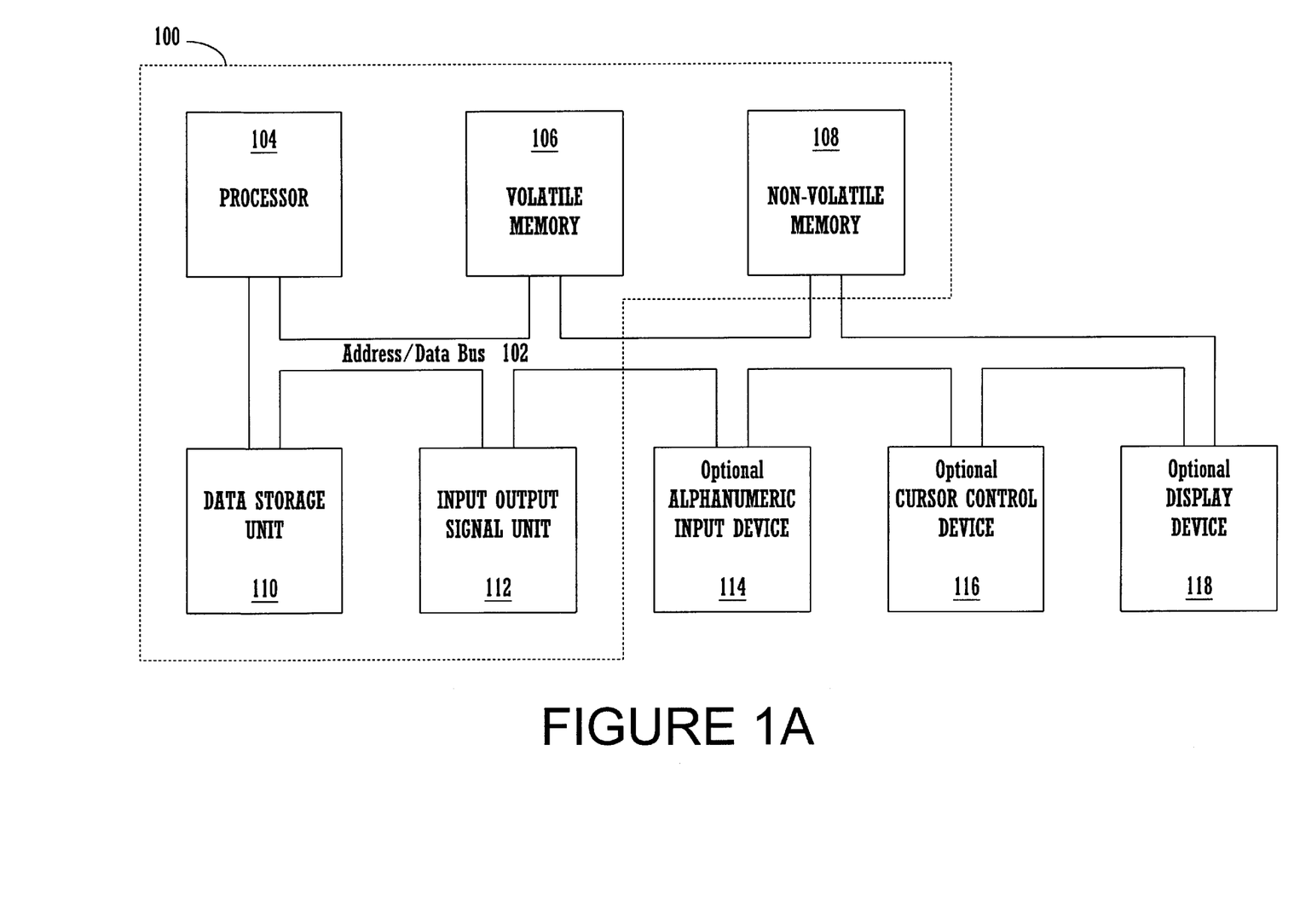
FIG. 1A is an exemplary general purpose computer system with which embodiments of the present invention can be implemented.

In general, as illustrated in FIG. 1A, computer system 100 includes an address/data bus 102 for communicating information, a central processor 104 coupled with bus 102 for processing information and instructions, a volatile memory 106 (e.g., random access memory RAM) coupled with bus 102 for storing information and instructions for central processor 104 and a non-volatile memory 108 (e.g., read only memory ROM) coupled with bus 102 for storing static information and instructions for processor 104. In accordance with embodiments of the present invention, processor 104 is a signal processor having a single instruction pointer.

Computer system 100 also includes a data storage device 110 ("disk subsystem") such as a magnetic or optical disk and disk drive coupled with bus 102 for storing information and instructions. Data storage device 110 can include one or more removable magnetic or optical storage media (e.g., diskettes, tapes) which are computer readable memories. In accordance with the present invention, data storage device 110 can contain a bitstream of encoded information. Memory units of system 100 include 106, 108 and 110. Computer system 100 can also include a signal input output communication device 112 (e.g., modem, network interface card NIC) coupled to bus 102 for interfacing with other computer systems. In accordance with the present invention, signal input output communication device 112 can receive an incoming encoded bitstream.

Also included in computer system 100 of FIG. 1A is an optional alphanumeric input device 114 including alphanumeric and function keys coupled to bus 102 for communicating information and command selections to central processor 104. Computer system 100 also includes an optional cursor control or directing device 116 coupled to bus 102 for communicating user input information and command selections to central processor 104. An optional display device 118 can also be coupled to bus 102 for displaying information to the computer user. Display device 118 may be a liquid crystal device, other flat panel display, cathode ray tube, or other display device suitable for creating graphic images and alphanumeric characters recognizable to the user. Cursor control device 116 allows the computer user to dynamically signal the two dimensional movement of a visible symbol (cursor) on a display screen of display device 118. Many implementations of cursor control device 116 are known in the art including a trackball, mouse, touch pad, joystick or special keys on alphanumeric input device 114 capable of signaling movement of a given direction or manner of displacement. Alternatively, it will be appreciated that a cursor can be directed and/or activated via input from alphanumeric input device 114 using special keys and key sequence commands. The present invention is also well suited to directing a cursor by other means such as, for example, voice commands.

It is appreciated that computer system 100 described herein illustrates an exemplary configuration of an operational platform upon which embodiments of the present invention can be implemented. Nevertheless, other computer systems with differing configurations can also be used in place of computer system 100 within the scope of the present invention.

Figure 1B:
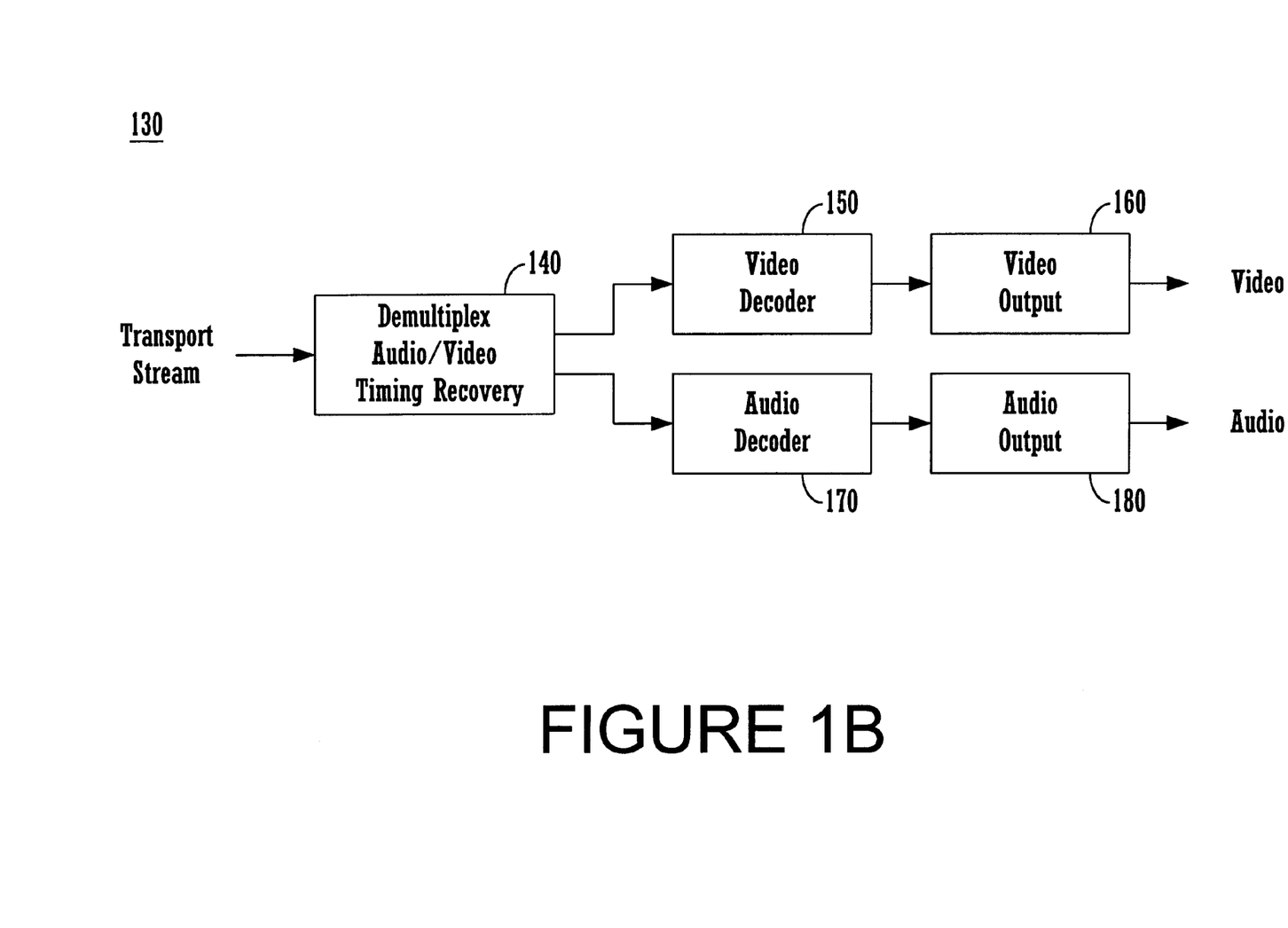
FIG. 1B is a block diagram illustrating an exemplary implementation of a software-based decoding system ("decoder") in accordance with one embodiment of the present invention.

Referring next to FIG. 1B, a block diagram illustrating an exemplary implementation of a software-based decoding system 130 in accordance with one embodiment of the present invention is shown. As illustrated in FIG. 1B, a demultiplexing module 140 receives a data stream (e.g., a transport stream in an MPEG-2 environment) comprising frames of compressed (e.g., encoded) data and system information and then separates the data stream into various elementary streams (e.g., audio stream, video stream). In one embodiment, demultiplexing module 140 also performs audio/video timing recovery by determining the correct time to start decoding the next frame. As such, audio/video synchronization is maintained. The audio and video elementary streams are then received by an audio decoding module 170 and a video decoding module 150, respectively, which decode the elementary streams into uncompressed audio and video data. An audio output module 180 and a video output module 160 receive the respective uncompressed audio and video data, format the data for output, and output the formatted data with correct timing. In one embodiment, video output module 160 supplies display device 118 with the formatted data. The control flow and data flow among these functional modules are described in detail further below with reference to FIGS. 3A and 3B.

Figure 2:
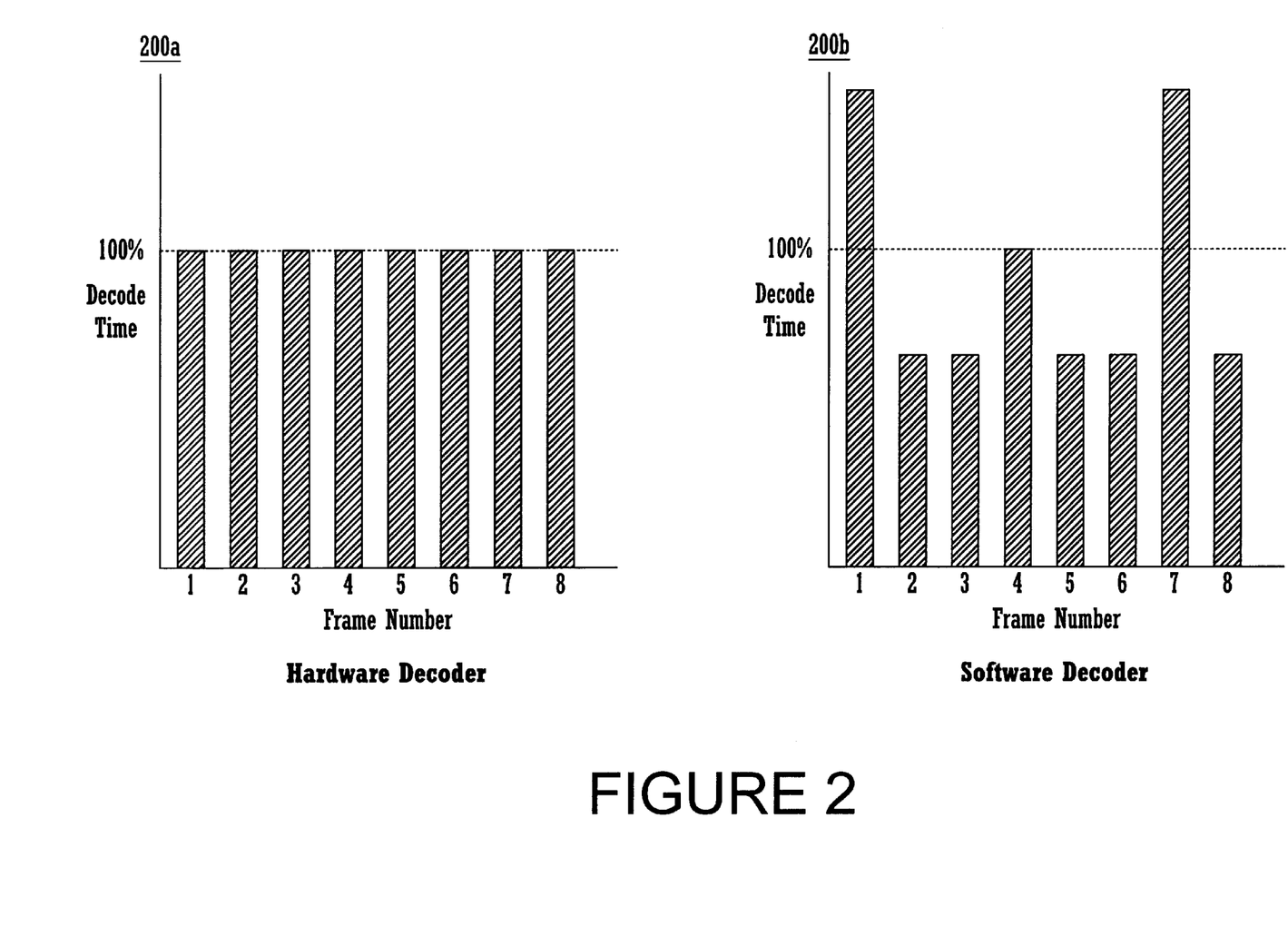
FIG. 2 illustrates timing differences between hardware-based decoding and software-based decoding and illustrates overrun instances for particular frames.

With reference next to FIG. 2, timing differences between hardware-based decoding and software-based decoding are illustrated. In bar charts 200a and 200b, the 100% marks on the time axes indicate the output or display time per frame. It is appreciated that the display time per frame is a fixed interval determined by the format of the output video or audio. For instance, an exemplary video display frequency is 30 frames per second (⅟30 of a second per frame), and an exemplary audio output frequency is 48000 samples per second (⅟48000 of a second per sample). Bar chart 200a shows that in a hardware-based decoding system, it takes the same amount of time to decode each and every frame (e.g., frames 1 through 8) in a data stream. Importantly, the decoding time for a frame never exceeds the display time of the frame (100%).

In contrast, still referring to FIG. 2, bar chart 200b illustrates that in a software-based decoding system in accordance with the present invention, decoding time varies from frame to frame. Processing time in demultiplexing module 140 depends upon the transport stream bit rate and system information complexity. Likewise, processing time in video decoding module 150 depends upon the video resolution, the compression amount, and the frame type of the particular frame. Consequently, unless the processing time for a frame is always less than or equal to the display time of that frame, there would be cases, hereinafter referred to as overrun cases, where the processing is not completed fast enough to support real time display. More particularly, in bar chart 200*b*, the decoding time for frames 1 and 7 exceeds the display time per frame and, as such, frames 1 and 7 are examples of an overrun case as has been described above.

On the other hand, for frames 2, 3, 5, 6 and 8 in bar chart 200*b*, the decoding time is shorter than the display time per frame. Importantly, the present invention appreciates that real time output can be consistently sustained despite the existence of overrun cases by decoupling decoding timing from output timing such that the output is not affected by the delayed availability of a frame in an overrun case. More specifically, the present invention maintains a number of frames that have been decoded and are thus ready for output so that the output is not contingent upon the completion of decoding of the instant frame. The present invention also schedules the decoding of successive frames such that a portion of the display time in a non-overrun case is utilized to make up for the excess decoding time needed in an overrun case. As such, in accordance with the present invention, real time output can be sustained in a consistent manner even when overrun cases are encountered.

Furthermore, since real time output is sustained even in overrun cases under this system, the present invention also enables the use of a signal processor that delivers sufficient performance to handle the average frame within the display time per frame and does not require the use of a processor that is capable of handling the worst case frame within the display time per frame. Consequently, the present invention advantageously minimizes the cost of manufacturing software-based decoders by using inexpensive signal processors which can sustain real time display in all circumstances.

The present invention achieves the decoupling of decoding timing from output timing by using message queues and data buffers in conjunction with the functional modules of a software-based decoding system as described above with reference to FIG. 1B. Message queues are used to implement control flow among the various functional modules, whereas data buffers are used to facilitate data flow between the different functional modules. By incorporating message queues and data buffers into the decoding system, decoding timing can be effectively decoupled from output timing. Details of exemplary messages queues and data buffers and their relations with the functional modules of a software-based decoding system in accordance with the present invention are described below with reference to FIGS. 3A and 3B.

Figure 3A:
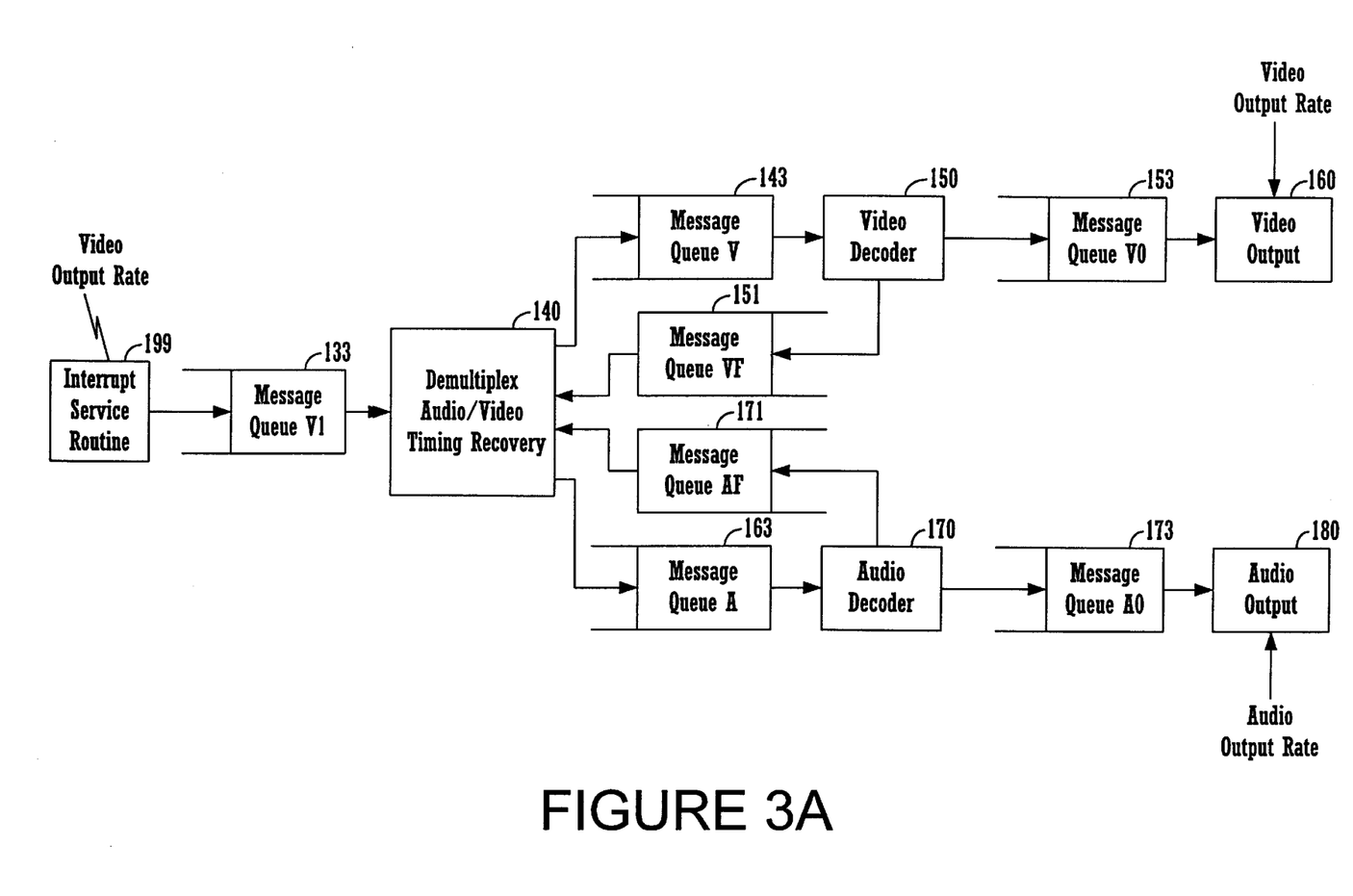
FIG. 3A is a control flow diagram illustrating exemplary control flow among functional modules via message queues of a software-based decoding system in accordance with an embodiment of the present invention.

FIG. 3A is a control flow diagram illustrating exemplary control flow among functional modules via message queues of a software-based decoding system 130 in accordance with an embodiment of the present invention. As illustrated in FIG. 3A, an interrupt service routine (ISR) module 199 is triggered by periodic hardware interrupts that form the time basis of all task executions (events) in the instant decoding system. Upon each interrupt, ISR module 199 sends a message on message queue V1 133. Demultiplexing module 140 receives messages from ISR module 199 via message queue V1 133, and sends messages to video decoding module 150 and audio decoding module 170 via message queue V 143 and message queue A 163, respectively. In turn, video and audio decoding modules 150 and 170 send feedback messages to demultiplexing module 140 via message queue VF 151 and message queue AF 171, respectively. Moreover, video and audio decoding modules 150 and 170 also send messages to video and audio output modules 160 and 180 via message queue VO 153 and message queue AO 173, respectively. Table 1 below summarizes exemplary functions corresponding to each message queue described above and exemplary data carried therein. The detailed timing of the message passing and event triggering is described further below with reference to FIGS. 4 through 8.

TABLE 1

Exemplary Message Queues

| Queue | Function | Data carried |
|---|---|---|
| V1 | demultipiex execution timing | execution timing |
| V | video decode control | command (wait, first decode, next decode) elementary stream buffer information (buffer start, buffer size, write pointer, read pointer) |
| A | audio decode control | command (wait, first decode, next decode) elementary stream buffer information (buffer start, buffer size, write pointer, read pointer) |
| VF | video decode feedback | decoding status (success, failure type) elementary stream buffer information (read pointer) header information (e.g., picture or sequence header information) |
| AF | audio decode feedback | decoding status elementary stream buffer information (read pointer) |
| VO | video output control | next displayed frame ID picture characteristics (picture size, picture rate) |
| AO | audio output control | next displayed frame ID |

Figure 3B:
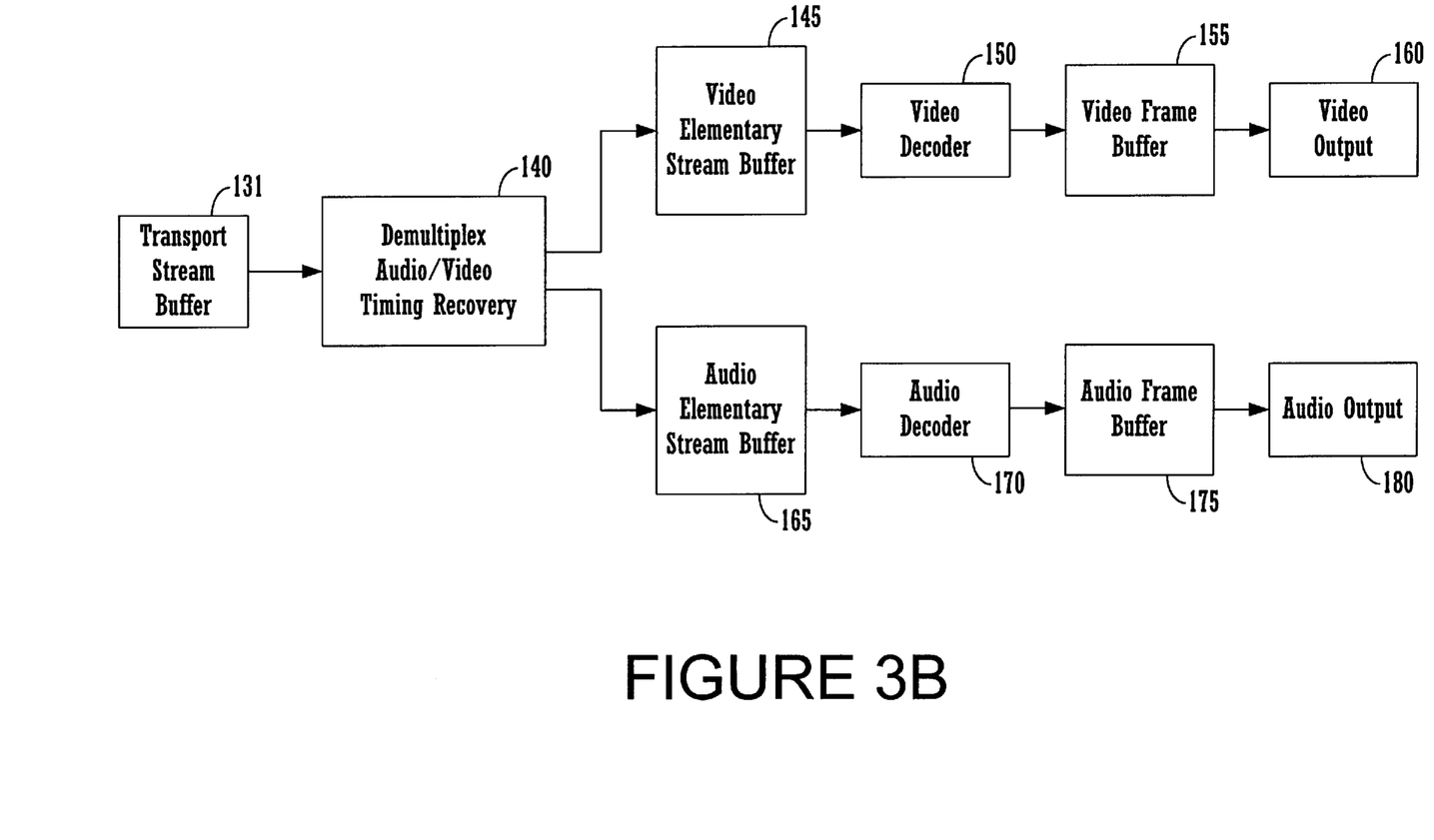
FIG. 3B is a data flow diagram illustrating exemplary data flow among functional modules via data buffers of a software-based decoding system in accordance with one embodiment of the present invention.

With reference next to FIG. 3B, a data flow diagram illustrating exemplary data flow among functional modules via data buffers of a software-based decoding system 130 in accordance with one embodiment of the present invention is shown. Demultiplexing module 140 receives an incoming data stream from a transport stream buffer 131, and delivers its output elementary streams to a video elementary stream buffer 145 and an audio elementary stream buffer 165. Video and audio decoding modules 150 and 170 receives their input from video elementary stream buffer 145 and audio elementary stream buffer 165, respectively, and feed their outputs of uncompressed audio and video data to a video frame buffer 155 and an audio frame buffer 175, respectively. Video output module 160 receives frames of video data from video frame buffer 155, whereas audio output module 180 receives frames of audio data from audio frame buffer 175. The detailed timing of the data flow between the different functional modules is described further below with reference to FIGS. 4 through 8.

In an exemplary embodiment of the present invention, video and audio elementary stream buffers 145 and 165 are large enough to allow extra data to accumulate therein, such that they do not overflow during an overrun case.

Figure 4:
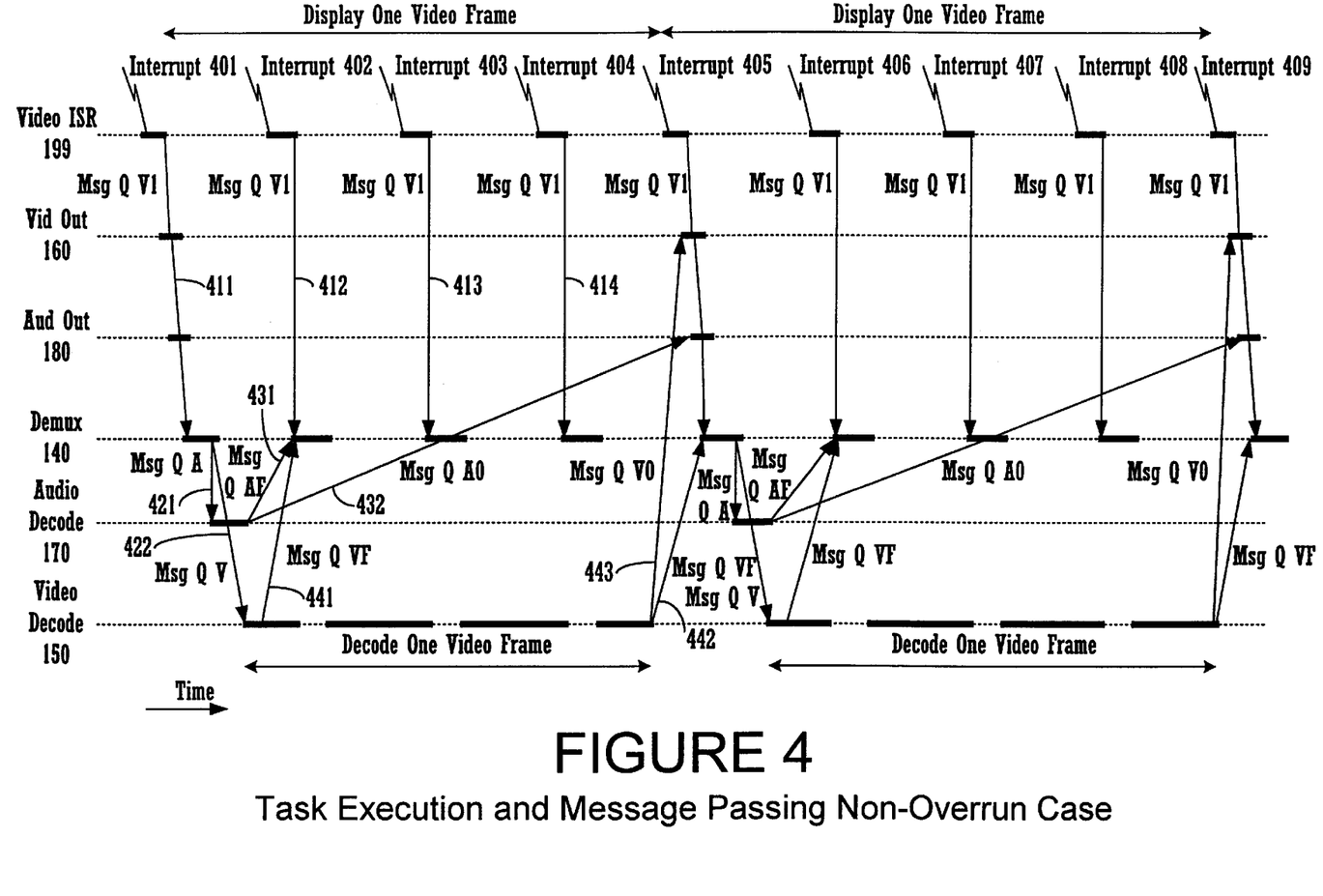
FIG. 4 is a timing diagram illustrating timing of task execution and message passing in a software-based decoding system in a non-overrun case in accordance with one embodiment of the present invention.
Figure 5:
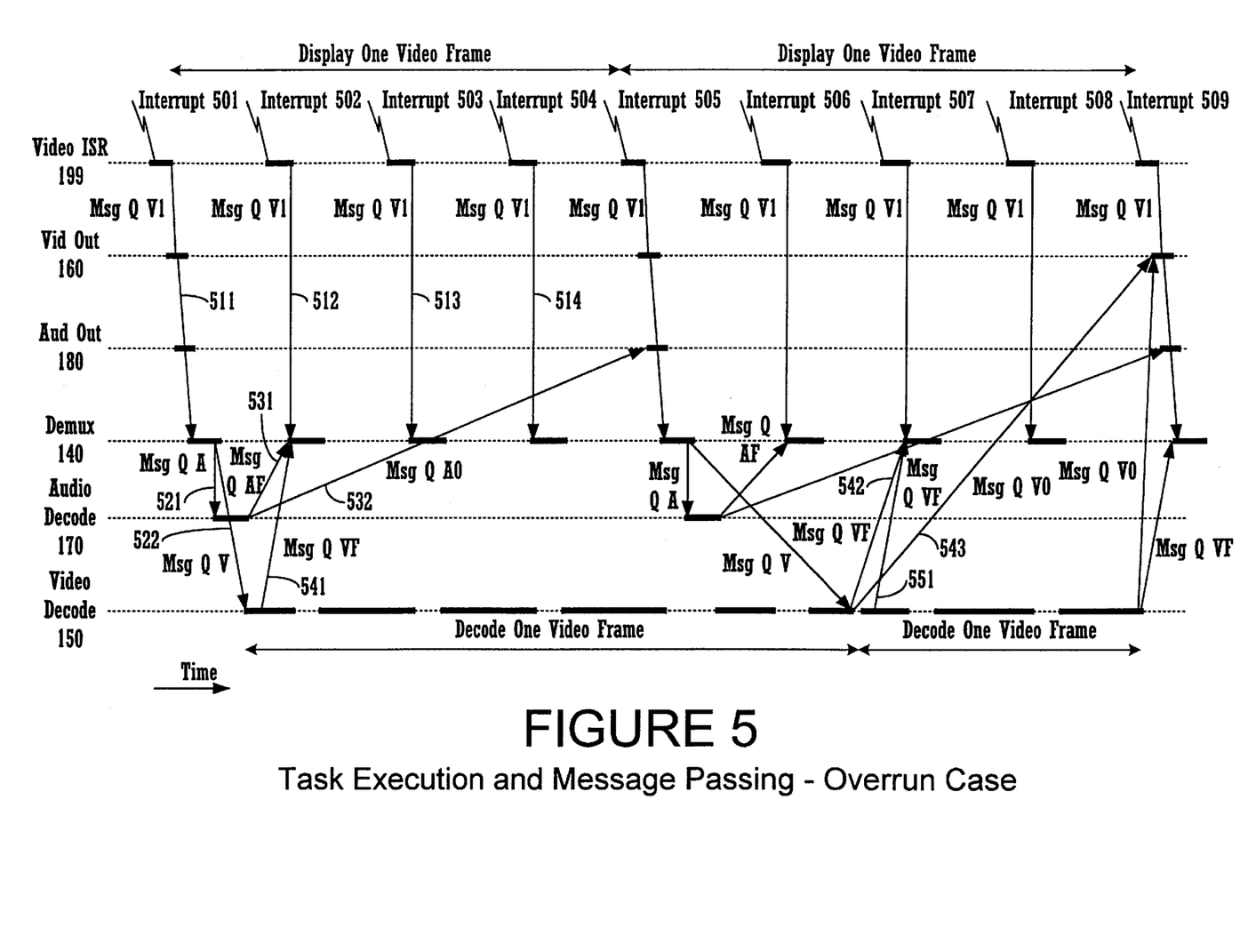
FIG. 5 is a timing diagram illustrating timing of task execution and message passing in a software-based decoding system in an overrun case in accordance with one embodiment of the present invention.

FIGS. 4 and 5 are both timing diagrams illustrating timing of task execution and message passing in a software-based decoding system in accordance with embodiments of the present invention. More specifically, FIG. 4 illustrates timing of task execution and message passing in a non-overrun case in accordance with one embodiment of the present invention, whereas FIG. 5 illustrates timing of task execution and message passing in an overrun case in accordance with one embodiment of the present invention. In FIGS. 4 and 5, each thickened horizontal time segment corresponding to a particular functional module indicates that task execution is ongoing in that particular functional module for the duration of that time segment. Note that only one thread of execution can be performed at any given time because within the scope of the present invention, signal processor 104 has a single instruction pointer. Thus, in FIGS. 4 and 5, there exists no overlap of thickened horizontal time segments, indicating that only one functional module can be executing a task at any given time.

Moreover, each arrow in FIGS. 4 and 5 indicates that a message is being passed from one functional module to another. The message queue name next to an arrow is the message queue on which the message is put. The foot of an arrow marks the time at which the message is sent (put on the corresponding queue), while the head of the arrow marks the time at which the message is received (removed from the queue). The respective functions and data carried in the messages are described below and can also be found in Table 1 above.

In the exemplary embodiments illustrated in FIGS. 4 and 5, four interrupts are generated (e.g., by the video output hardware) in each output frame (e.g., interrupts 401 through 404 in the first output frame in FIG. 4, interrupts 501 through 504 in the first output frame in FIG. 5). Once in each output frame, upon the first of the four interrupts in each output frame, ISR module 199 triggers the execution of video and audio output modules 160 and 180. Furthermore, upon each interrupt, ISR module 199 sends an execution timing message (e.g., messages 411 through 414 in FIG. 4, messages 511 through 514 in FIG. 5) to demultiplexing module 140 via message queue V1 133. Although an interrupt frequency of four interrupts per output frame is used in these exemplary embodiments, different interrupt frequencies can be supported within the scope of the present invention. It is appreciated that more frequent demultiplex executions allows transport stream buffer 131 (FIG. 3B) to be smaller in size and also improves decoder control granularity, at the expense of interrupting decoder execution more frequently.

Referring still to FIGS. 4 and 5, in these embodiments of the present invention, when demultiplexing module 140 completes its task, it sends an audio decode control message (e.g., message 421 in FIG. 4, message 521 in FIG. 5) to audio decoding module 170 via message queue A 163 and a video decode control message (e.g., message 422 in FIG. 4, message 522 in FIG. 5) to video decoding module 150 via message queue V 143. Each of these two types of decode control messages contains a command and also elementary stream buffer information. In particular, the command in each of the messages instructs the message recipient (video decoding module 150 or audio decoding module 170) whether to start decoding or not.

With reference again to FIGS. 4 and 5, if video and audio decoding modules 150 and 170 are commanded to decode (e.g., when the command in the video/audio control message is 'first decode' or 'next decode'), video and audio decoding modules 150 and 170 start to process the respective elementary stream data. In these exemplary embodiments of the present invention, when audio decoding module 170 completes its decoding task, an audio decode feedback message (e.g., message 431 in FIG. 4, message 531 in FIG. 5) is sent back to demultiplexing module 140 via message queue AF 171, and an audio output control message (e.g., message 432 in FIG. 4, message 532 in FIG. 5) including the identity of the decoded frame is sent to audio output module 180 via message queue AO 173. Moreover, in these embodiments, as soon as video decoding module 150 locates header information (e.g., picture or sequence header information) in the video elementary stream data, a video decode feedback message (e.g., message 441 in FIG. 4, message 541 in FIG. 5) is sent back to demultiplexing module 140 via message queue VF 151 to immediately relay the header information. Once the video decode feedback message has been sent, video decoding module 150 continues to decode the frame. Note that thus far the timing of task execution and message passing is the same within a given output frame in a non-overrun case (FIG. 4) as in an overrun case (FIG. 5).

With reference to FIG. 4, in a non-overrun case, video decoding module 150 completes its task of decoding one frame within the duration of the frame display time. Upon completion of the video decoding task, and before output of the next frame begins, another video decode feedback message (e.g., message 442) is sent back to demultiplexing module 140 via message queue VF 151 to relay the decoding status and the updated read pointer information. In addition, a video output control message (e.g., message 443) including the identity of the decoded frame is sent to video output module 160 via message queue VO 153. Moreover, in a non-overrun case as illustrated by FIG. 4, even though no other task is pending execution when decoding of one frame is completed, decoding of the next frame does not start immediately.

In contrast, with reference to FIG. 5, in an overrun case, video decoding module 150 does not complete its decoding task within the duration of the frame display time. When the decoding of the overrun frame is eventually completed, typically during the display of the following frame as is shown in FIG. 5, a second video decode feedback message (e.g., message 542) is sent back to demultiplexing module 140 via message queue VF 151 to relay the decoding status and the updated read pointer information, and a video output control message (e.g., message 543) including the identity of the decoded frame is sent to video output module 160 via message queue VO 153. Note that another video decode feedback message (e.g., message 551) containing header information of the next frame is also sent by video decoding module 150 to demultiplexing module 140 shortly thereafter.

Furthermore, in one embodiment of the present invention as illustrated in FIG. 5, once the decoding of the overrun frame is completed, decoding of the next frame begins substantially immediately. By scheduling the decoding of successive frames in this manner, the present invention allows the decoding system to "catch up" after an overrun case by utilizing a portion of the display time in subsequent non-overrun case(s) to make up for the excess decoding time used in the overrun case. Thus, in accordance with the present invention, real time output can be consistently sustained despite the occurrence of overrun cases.

More specifically, in one embodiment of the present invention, video and audio decoding modules 150 and 170 internally manage the elementary stream buffer read pointer rather than relying on the read pointer provided by demultiplexing module 140. Recall that video and audio decoding modules 150 and 170 send the updated read pointer back to demultiplexing module 140 at the end of decoding each frame. Thus, it video and audio decoding modules 150 and 170 have to rely on demultiplexing module 140 to furnish the updated read pointer information, demultiplexing module 140 must wait until a frame has been fully decoded before commanding video and audio decoding modules 150 and 170 to decode the next frame. In a non-overrun case, this commanding structure is feasible because the feedback of the read pointer information occurs before output of the next frame begins. However, in an overrun case, this commanding structure is highly inefficient and would preclude the decoding system from "catching up" after an overrun case. By having video and audio decoding modules 150 and 170 internally manage the elementary stream buffer read pointer, the present invention enables demultiplexing module 140 to stack up multiple messages in message queue V 143 and message queue A 163, thereby allowing the decoding system to immediately decode the frame following an overrun case without delay.

Moreover, in exemplary embodiments of the present invention, when video decoding module 150 encounters header information as it parses the video elementary stream data, the header information is relayed back to demultiplexing module 140 immediately without waiting for the decoding of the frame to be completed. While it is generally feasible for demultiplexing module 140 to use time stamps embedded in the elementary streams to determine the correct time to command decoding of the next frame, it is known that certain input streams do not include these embedded time stamps. Thus, it is not desirable to rely on the availability of these time stamps. Moreover, demultiplexing module 140, video decoding module 150 and video output module 160 often operate at different frame rates. As an example, it is possible that a compressed bitstream requires decoding at 24 frames per second, the required video output rate is 60 frames per second, and demultiplexing is executed at a multiple of the video output frame rate. As such, demultiplexing module 140 must command video decoding module 150 to decode at the correct stream rate, and video output module 160 must repeatedly display frames as necessary to achieve the desired output rate.

It is appreciated that the early transmission of header information in accordance with the present invention enables demultiplexing module 140 to calculate the expected display time for the instant frame as soon as possible in the decoding process, so that demultiplexing module 140 can promptly determine when to command decoding of the next frame. More particularly, by proactively providing all the information necessary to determine the correct time to command decoding of the next frame, the present invention enables demultiplexing module 140 to efficiently handle overrun cases. This is because demultiplexing module 140 can stack up decode commands via video decode control messages such that decoding of the next frame will start as soon as the overrun case is fully decoded.

In exemplary embodiments of the present invention, several video and audio output control messages are allowed to stack up in message queue VO 153 and message queue AO 173 during system startup. In other words, in these embodiments, multiple frames are decoded before the first frame is ever displayed. By maintaining multiple frames that are ready for output in this manner, the present invention can sustain real time output even when an overrun case is encountered. More specifically, even though decoding of the overrun case cannot be finished within the frame output time, there are buffered frames immediately available for output. It is appreciated that the number of frames maintained for ready output can vary within the scope of the present invention. More particularly, the number of frames can be selected by balancing the size of video and audio frame buffers 155 and 175 (FIG. 3B) against the ability of the system to handle consecutive overrun cases.

Figure 6:
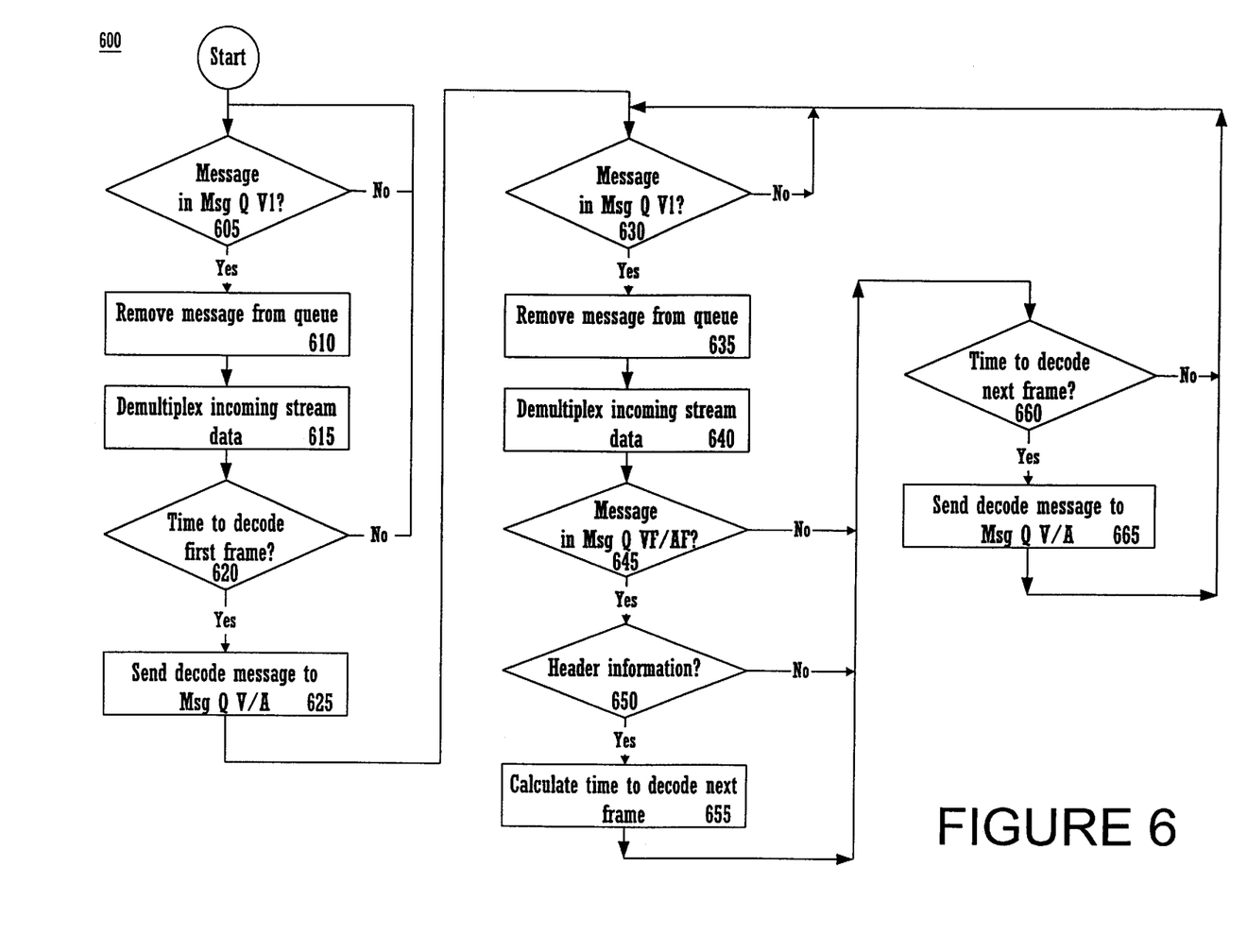
FIG. 6 is a flow diagram illustrating steps for performing data stream demultiplexing and audio/video timing recovery in accordance with one embodiment of the present invention.

Referring next to FIG. 6, a flow diagram 600 illustrating steps for performing data stream demultiplexing and audio/video timing recovery in accordance with demultiplexing module 140 (FIG. 3B) for one embodiment of the present invention is shown. In step 605, demultiplexing module 140 determines whether a message is present in message queue V1 133. In one embodiment, if a message is present, process 600 proceeds to step 610; otherwise, step 605 is repeated. In another embodiment, demultiplexing module 140 waits (blocks) until a message appears in message queue V1 133 and then step 610 is entered.

In step 610, demultiplexing module 140 removes the message from message queue V1 133.

In step 615, demultiplexing module 140 demultiplexes the incoming stream data. In one embodiment, demultiplexing module 140 receives stream data comprising compressed data and system information and separates the incoming stream data into audio and video elementary streams as illustrated in FIG. 1B above.

In step 620, demultiplexing module 140 determines whether or not it is the correct time to command video/audio decoding of the first frame. If the answer is affirmative, step 625 is entered, wherein demultiplexing module 140 sends video/audio decode command to video and audio decoding modules 150 and 170 via message queue V 143 and message queue A 163. If it is not the correct time to command decoding of the first frame, process 600 returns to step 605. In one exemplary embodiment, there are two independent decisions involved in step 620, one with respect to video decoding and the other with respect to audio decoding, and step 625 performs the message passing accordingly. In one embodiment, demultiplexing module 140 uses the fullness of video and audio elementary stream buffers 145 and 165 as well as the timestamps extracted from the elementary streams to make the determination of step 620.

In step 630, demultiplexing module 140 again determines whether a message is present in message queue V1 133. In one embodiment, if a message is present, step 635 is entered; otherwise, step 630 is repeated. In another embodiment, demultiplexing module 140 waits (blocks) until a message appears in message queue V1 133 and then step 635 is entered.

In step 635, demultiplexing module 140 removes the message from message queue V1 133.

In step 640, demultiplexing module 140 demultiplexes the incoming stream data. In one embodiment, demuitiplexing module 140 separates the incoming stream data into audio and video elementary streams.

In step 645, demultiplexing module 140 determines whether a message is present in message queue VF 151 or in message queue AF 171. In one embodiment, if a message is present, step 650 is entered; otherwise, step 660 is entered instead. In an exemplary embodiment, two independent decisions are made in step 645, one with respect to message queue VF 151 and the other with respect to message queue AF 171. In one embodiment, step 650 is entered only if it is determined in step 645 that a message is present in message queue VF 151; if there is no message in message queue VF 151, step 660 is entered instead. This is because in this embodiment no header information is available in the audio decode feedback message. In one embodiment, the correct time to decode the next audio frame is calculated based on a fixed decode interval.

In step 650, demultiplexing module 140 determines whether or not header information is included in the message in message queue VF 151. If so, step 655 is entered; otherwise, step 660 is entered instead.

In step 655, demultiplexing module 140 calculates the correct time to command the decoding of the next frame based on the header information in the message received in message queue VF 151.

In step 660, demultiplexing module 140 determines whether or not it is time to command video/audio decoding of the next frame. If the answer is affirmative, step 665 is entered; otherwise, step 630 is re-entered instead. In an exemplary embodiment, two independent decisions are made in step 660, one with respect to video decoding and the other with respect to audio decoding, and step 665, described below, performs the message passing accordingly.

In step 665, demultiplexing module 140 sends video/audio decode command to video and audio decoding modules 150 and 170 via message queue V 143 and message queue A 163 based on the determination in step 660. Upon the completion of step 665, step 630 is re-entered and process 600 continues therefrom.

Figure 7:
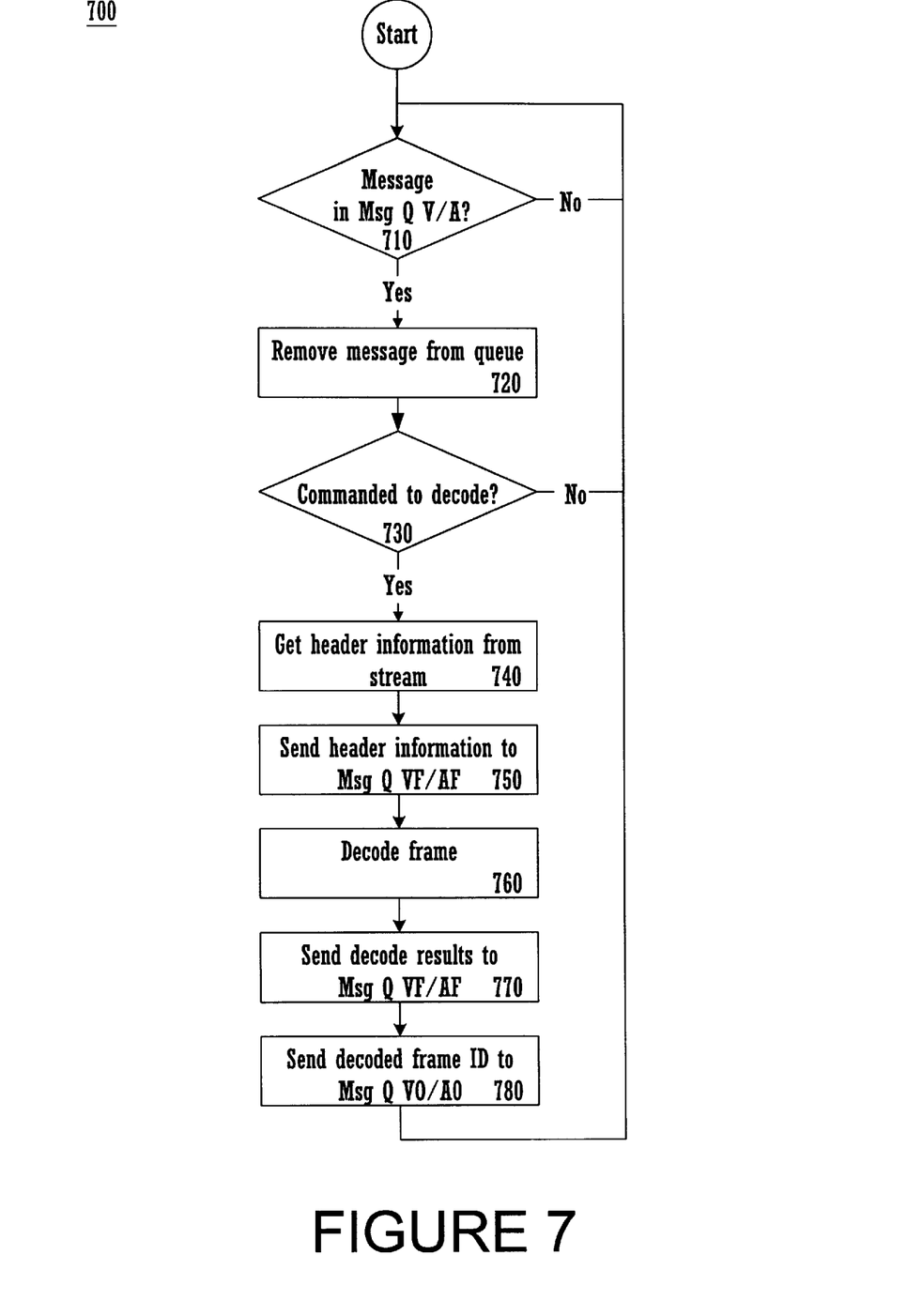
FIG. 7 is a flow diagram illustrating steps for performing audio/video decoding in accordance with one embodiment of the present invention.

With reference next to FIG. 7, a flow diagram 700 illustrating steps for performing audio/video decoding in accordance with one embodiment of the present invention is shown. In step 710, video and audio decoding modules 150 and 170 each determines whether a message is present in message queue V 143 and message queue A 163, respectively. In one embodiment, if a message is present, step 720 is entered; otherwise, step 710 is repeated. In another embodiment, the respective decoding module waits (blocks) until a message appears in the corresponding message queue and then step 720 is entered. It is appreciated that the determination by video and audio decoding modules 150 and 170 are independent of each other, and that flow diagram 700 is shown as in FIG. 7 for ease of explanation.

In step 720, the respective decoding module removes the message from the corresponding message queue. In step 730, the respective decoding module determines whether or not it has been commanded to decode. If the answer is affirmative, step 740 is entered; otherwise, process 700 returns to step 710. In step 740, the respective decoding module obtains the appropriate header information from the incoming elementary stream.

In step 750, the respective decoding module sends the header information back to demultiplexing module 140 via the corresponding message queue. This provides an early feedback of header information back to demultiplexing module 140 as described above.

In one embodiment, steps 740 and 750 are entered only if it is determined in step 730 that video decoding module 150 has been commanded to decode; otherwise, process 700 directly enters step 760 from step 730. This is because in this embodiment no header information is available in the audio elementary stream.

In step 760, the respective decoding module finishes decoding the frame. In an exemplary embodiment, step 760 consumes the bulk of the processing time in the respective decoding module. In step 770, the respective decoding module sends the results of the decoding back to demultiplexing module 140 via the corresponding message queue. In one embodiment, the information sent include the decoding status as well as the updated read pointer. In step 780, the respective decoding module sends the identity of the decoded frame to the corresponding output module via the corresponding message queue (message queue VO 153, message queue AO 173). Upon the completion of step 780, step 710 is re-entered and process 700 continues therefrom.

Figure 8:
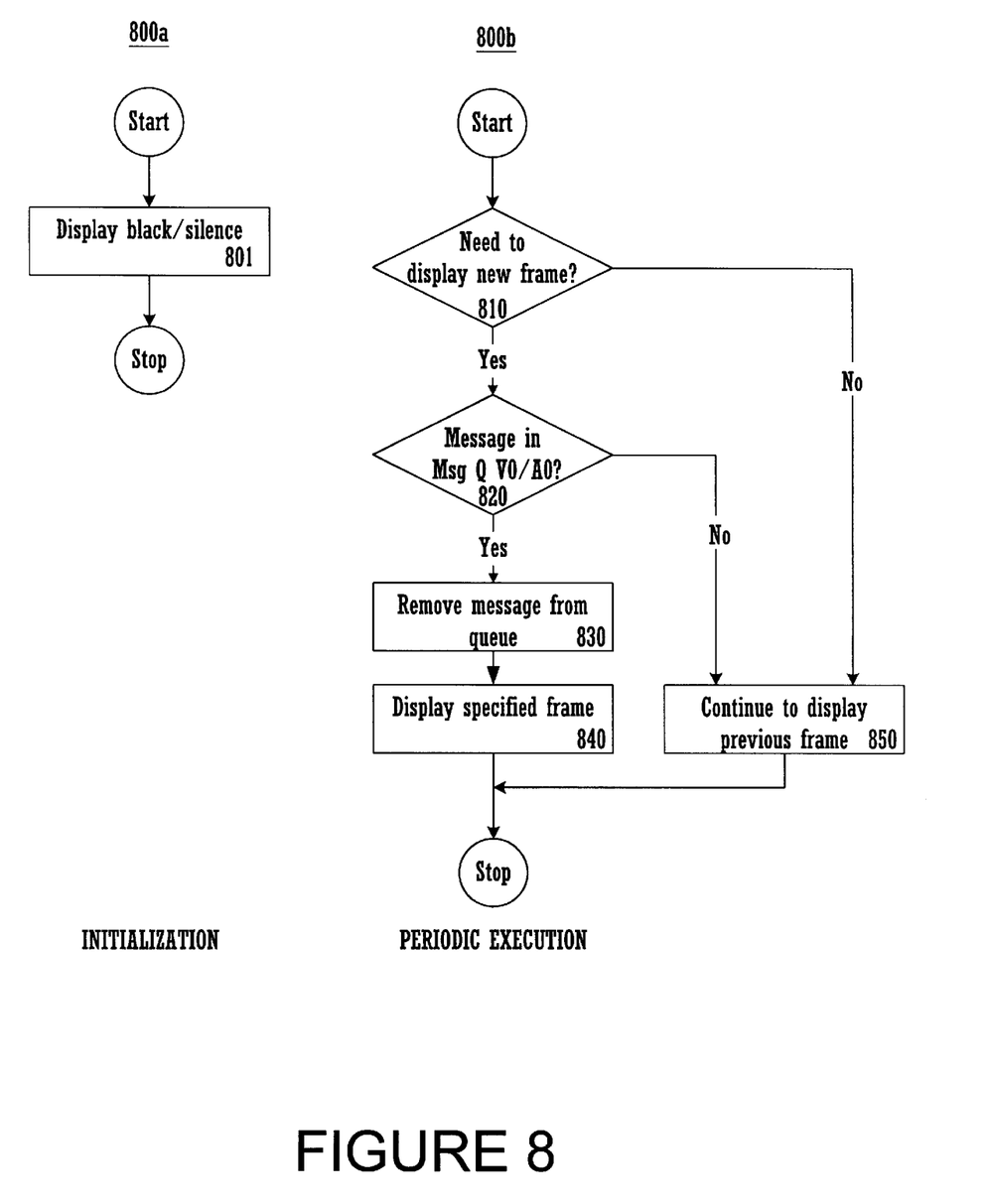
FIG. 8 includes two flow diagrams illustrating steps for performing audio/video output in accordance with one embodiment of the present invention.

Referring next to FIG. 8, flow diagrams 800a and 800b illustrating steps for performing audio/video output in accordance with one embodiment of the present invention are shown. More specifically, process 800a illustrates an initialization step of video and audio output modules 160 and 180, whereas process 800b illustrates steps that are periodically executed (e.g., at the output frame rate) in video and audio output modules 160 and 180 in accordance with one embodiment of the present invention.

In step 801 of process 800a, video and audio output modules 160 and 180 output black and silence, respectively. It is appreciated that process 800a is run during the initialization of the system. Once a sufficient number of decoded frames have been accumulated in video and audio frame buffers 155 and 175, as indicated by the number of video and audio output control messages stacked up in message queue VO 153 and message queue AO 173, process 800b will take over and video and audio output modules 160 and 180 will start to output frames.

Referring now to process 800b, in step 810, video and audio output modules 160 and 180 each determines whether it is necessary to output a new frame. If the answer is affirmative, step 820 is entered; otherwise, step 850 is entered, wherein the respective output module continues to output the previous frame. It is appreciated that the determination by video and audio output modules 160 and 180 are independent of each other, and that flow diagram 800b is shown as in FIG. 8 for ease of explanation.

In step 820, video and audio output modules 160 and 180 each determines whether a message is present in message queue VO 153 and message queue AO 173, respectively. If the answer is affirmative, step 830 is entered; otherwise, step 850 is entered, wherein the respective output module continues to output the previous frame. As in step 810, the determination by video and audio output modules 160 and 180 in step 820 are independent of each other.

In step 830, the respective output module removes the message from the corresponding message queue. In step 840, the respective output module outputs the specified frame.

In an exemplary embodiment of the present invention, video output module 160 considers both the video frame display rate and the compressed bitstream frame rate to determine when it needs to repeatedly output the same frame. For instance, if the bitstream rate is 24 frames per second while the video output rate is 60 frames per second, it is possible that periodically no new frame is available for display, and video output module 160 then has to repeatedly display the previous frame until a new frame is made available.

It is appreciated that embodiments of the present invention as described herein are optimized for implementation with a cooperative multi-tasking (e.g., non-preemptive) operating system. More specifically, these embodiments depend on the operating system to provide support for blocking and non-blocking message queues. These exemplary embodiments also depend on the operating system to offer relatively light-weight context switches on message queue block. Nevertheless, it should be clear to a person of ordinary skill in the programming art, having read the description of embodiments of the present invention herein, that other operating systems and/or implementation platforms can also be used without departing from the scope of the present invention.

Moreover, although embodiments of the present invention as described herein uses a single-instruction-pointer processor, it is appreciated that a multiple-instruction-pointer processor can also be used advantageously in accordance with the present invention. For example, using a signal processor having multiple instruction units, a software-based decoding system in accordance with one embodiment of the present invention can be partitioned so that each of the functional modules shown in FIG. 1B is assigned to a unique instruction unit of the processor. In this embodiment, decoding time still depends heavily on the complexity of the incoming bitstream even though the functional modules operate in parallel. As such, overrun cases can still occur unless a processor that can handle the worst case bitstream is used. The present invention thus enables the use of a multiple-instruction-pointer signal processor that is less powerful than a processor capable of handling the worst case frame within the display time per frame and still sustains real time display in all circumstances. Therefore, the present invention can be used with a multiple-instruction-pointer processor to realize the same advantageous cost saving as in the case of a single-instruction-pointer processor.

Although specific structures of message queues and data buffers are described above with embodiments of the present invention, the present invention can also be practiced with alternative control mechanisms which do not utilize message queues and/or data buffers as described herein. Moreover, although exemplary values for various settings and/or configurations are given with respect to embodiments of the present invention described above, such values are illustrative only and can vary within the scope and spirit of the present invention.

The preferred embodiment of the present invention, a flexible software-based decoding system with decoupled decoding timing and output timing, is thus described. While the present invention has been described in particular embodiments, it should be appreciated that the present invention should not be construed as limited by such embodiments, but rather construed according to the below claims.

What is claimed is:

1. A computer software implemented method of decoding a data stream comprising encoded frames of video data, said software method comprising the steps of:
   a) maintaining a plurality of decoded frames in a frame buffer, said plurality of decoded frames being ready for output;
   b) decoding a first encoded frame of said data stream to generate a first additional decoded frame;
   c) provided that completion of said step b) requires more time than a predefined frame output time, outputting a first of said plurality of decoded frames before said step b) is completed; and
   d) adding said first additional decoded frame to said frame buffer, wherein real-time output is maintained irrespective of whether completion of said step b) requires more time than said predefined frame output time for particular frames.

2. The method as recited in claim 1 further comprising the steps of:
   e) provided that completion of said step b) requires more time than said predefined frame output time, decoding a second encoded frame of said data stream substantially immediately upon completion of said step b) to generate a second additional decoded frame; and
   f) adding said second additional decoded frame to said frame buffer.

3. The method as recited in claim 1 further comprising the steps of:
   e) provided that completion of said step b) does not require more time than said predefined frame output time, decoding a second encoded frame of said data stream after completion of said outputting said first of said plurality of decoded frames to generate a second additional decoded frame; and
   f) adding said second additional decoded frame to said frame buffer.

4. The method as recited in claim 1 further comprising the step of outputting said first of said plurality of decoded frames repeatedly until a new frame is available in said frame buffer.

5. The method as recited in claim 1 further comprising the step of demultiplexing said data stream, said demultiplexing step comprising the step of generating an audio elementary stream and a video elementary stream from said data stream.

6. The method as recited in claim 5 wherein said demultiplexing step further comprises the step of determining a correct time to begin decoding a second encoded frame of said data stream.

7. The method as recited in claim 5 wherein said step b) comprises the step of identifying header information of said first encoded frame of said data stream, and wherein said demultiplexing step further comprises the step of determining a correct time to begin decoding a second encoded frame of said data stream using said header information as soon as said header information is identified.

8. The method as recited in claim 1 further comprising the step of outputting a black and silent frame during an initialization stage.

9. The method as recited in claim 1 further comprising the step of outputting said first of said plurality of decoded frames after said step b) is completed, provided that completion of said step b) does not require more time than said predefined frame output time.

10. A computer system comprising a processor coupled to a bus and a memory unit coupled to said bus, said memory unit having stored therein instructions that when executed implement a software method of decoding a data stream comprising encoded video data, said software method comprising the steps of:
    a) maintaining a plurality of decoded frames in a frame buffer, said plurality of decoded frames being ready for output;
    b) decoding a first encoded frame of said data stream to generate a first additional decoded frame;
    c) provided that completion of said step b) requires more time than a predefined frame output time, outputting a first of said plurality of decoded frames before said step b) is completed; and
    d) adding said first additional decoded frame to said frame buffer, wherein real-time output is maintained irrespective of whether completion of said step b) requires more time than said predefined frame output time for particular frames.

11. The computer system as recited in claim 10 wherein said method further comprises the steps of:
    e) provided that completion of said step b) requires more time than said predefined frame output time, decoding a second encoded frame of said data stream substantially immediately upon completion of said step b) to generate a second additional decoded frame; and
    f) adding said second additional decoded frame to said frame buffer.

12. The computer system as recited in claim 10 wherein said method further comprises the steps of:
    e) provided that completion of said step b) does not require more time than said predefined frame output time, decoding a second encoded frame of said data stream after completion of said outputting said first of said plurality of decoded frames to generate a second additional decoded frame; and
    f) adding said second additional decoded frame to said frame buffer.

13. The computer system as recited in claim 10 wherein said method further comprises the step of outputting said first of said plurality of decoded frames repeatedly until a new frame is available in said frame buffer.

14. The computer system as recited in claim 10 wherein said method further comprises the step of demultiplexing said data stream, said demultiplexing step comprising the step of generating an audio elementary stream and a video elementary stream from said data stream.

15. The computer system as recited in claim 14 wherein said demultiplexing step of said method further comprises the step of determining a correct time to begin decoding a second encoded frame of said data stream.

16. The computer system as recited in claim 14 wherein said step b) of said method comprises the step of identifying header information of said first encoded frame of said data stream, and wherein said demultiplexing step of said method further comprises the step of determining a correct time to begin decoding a second encoded frame of said data stream using said header information as soon as said header information is identified.

17. The computer system as recited in claim 10 wherein said method further comprises the step of outputting a black and silent frame during an initialization stage.

18. The computer system as recited in claim 10 wherein said method further comprises the step of outputting said first of said plurality of decoded frames after said step b) is completed, provided that completion of said step b) does not require more time than said predefined frame output time.

19. A computer system for decoding a data stream comprising encoded frames of video data, said computer system comprising:

frame buffering means for maintaining a plurality of decoded frames which are ready for output;

decoding means for decoding a first encoded frame of said data stream to generate a first additional decoded frame;

outputting means for outputting a first of said plurality of decoded frames before said decoding of said first encoded frame is completed whenever completion of said decoding of said first encoded frame requires more time than a predefined frame output time; and said frame buffering means also for storing said first additional decoded frame and said second additional decoded frame, wherein real-time output is maintained irrespective of whether completion of said decoding of said first encoded frame requires more time than said predefined frame output time for particular frames.

20. The computer system as recited in claim 19 wherein said decoding means is also for decoding a second encoded frame of said data stream substantially immediately upon completion of said decoding of said first encoded frame to generate a second additional decoded frame whenever completion of said decoding of said first encoded frame requires more time than a predefined frame output time, and said decoding means is further for decoding said second encoded frame of said data stream after completion of said outputting said first of said plurality of decoded frames to generate said second additional decoded frame whenever completion of said decoding of said first encoded frame does not require more time than said predefined frame output time, and wherein said outputting means is also for outputting said first of said plurality of decoded frames after said decoding of said first encoded frame is completed whenever completion of said decoding of said first encoded frame does not require more time than said predefined frame output time.

21. The computer system as recited in claim 19 further comprising demultiplexing means for generating an audio elementary stream and a video elementary stream from said data stream, wherein said demultiplexing means is also for identifying header information of said first encoded frame of said data stream, and said demultiplexing means is further for determining a correct time to begin decoding said second encoded frame of said data stream using said header information as soon as said header information is identified.

22. The computer system as recited in claim 19 wherein said outputting means is also for outputting a black and silent frame during an initialization stage, and said outputting means is further for outputting said first of said plurality of decoded frames repeatedly until a new frame is available in said frame buffering means.

23. A software-based decoding system for processing a data stream comprising encoded audio and video data, said system comprising:

a) a plurality of functional modules comprising:
a1) a demultiplexing module configured to receive said data stream and generate an elementary audio stream and an elementary video stream therefrom;
a2) a decoding module configured to decode said elementary audio stream and said elementary video stream into uncompressed audio and video data wherein said decoding module can take longer than the video frame update rate to decode a given video frame; and
a3) an output module configured to format said uncompressed audio and video data into formatted audio and video data, said output module also configured to output said formatted audio and video data with correct timing;

b) a plurality of message queues configured to facilitate communication and control among said plurality of functional modules; and c) a plurality of data buffers configured to facilitate data flow among said plurality of functional modules, wherein said system decouples timing of said decoding module from timing of said output module such that said output module consistently sustains real-time output.

24. A software-based decoding system as recited in claim 23 wherein the average rate of frame decoding does not exceed the video frame update rate.

* * * * *